United States Patent
Ko et al.

(10) Patent No.: US 11,947,545 B2
(45) Date of Patent: Apr. 2, 2024

(54) SYSTEMS AND METHODS FOR CONFIGURING DATA STREAM FILTERING

(71) Applicant: ADOBE INC., San Jose, CA (US)

(72) Inventors: Jonathan Ko, Fremont, CA (US); Ayush Tyagi, San Jose, CA (US); Fan Du, Milpitas, CA (US); Yi Jin, San Jose, CA (US); Keshav Vadrevu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 153 days.

(21) Appl. No.: 17/685,223

(22) Filed: Mar. 2, 2022

(65) Prior Publication Data

US 2023/0281203 A1 Sep. 7, 2023

(51) Int. Cl.
*G06F 16/00* (2019.01)
*G06F 16/2455* (2019.01)

(52) U.S. Cl.
CPC .............. *G06F 16/24568* (2019.01)

(58) Field of Classification Search
CPC ................................. G06F 16/24568
USPC .................................. 707/754, 769
See application file for complete search history.

(56) References Cited

U.S. PATENT DOCUMENTS

2011/0125778 A1* 5/2011 Kubo ............... G06F 16/24568
707/769
2016/0350427 A1* 12/2016 Cao .................... G06F 11/3409
2020/0402058 A1* 12/2020 Zhou .................... G06Q 20/385

OTHER PUBLICATIONS

Beswick, James, "Using AWS Lambda for Streaming Analytics," AWS Compute Blog, Dec. 2020,<https://aws.amazon.com/blogs/compute/using-aws-lambda-for-streaming-analytics/>, 10 pages.
Pandey, Yogi et al., "Create Azure Machine Learning Datasets," Azure Machine Learning, Nov. 2021, <https://docs.microsoft.com/en-us/azure/machine-learning/how-to-create-register-datasets>, 14 pages.

* cited by examiner

*Primary Examiner* — Chelcie L Daye
(74) *Attorney, Agent, or Firm* — Shook, Hardy & Bacon L.L.P.

(57) ABSTRACT

Systems and methods for configuring data stream filtering are disclosed. In one embodiment, a method for data stream processing comprises receiving an incoming dataset stream at a data stream processing environment, wherein the dataset stream comprises a data stream; configuring with a streaming data filter configuration tool, one or more filter parameters for a data filter that receives the data stream; computing with the streaming data filter configuration tool, one or more filter statistics estimates based on the filter parameters, wherein the filter statistics estimates are computed from sample elements of a representative sample of the data stream retrieved from a representative sample data store; outputting to a workstation user interface the filter statistics estimates; and configuring the data filter to apply the filter parameters to the data stream in response to an instruction from the workstation user interface.

20 Claims, 9 Drawing Sheets

SYSTEMS AND METHODS FOR CONFIGURING DATA STREAM FILTERING

BACKGROUND

Many organizations utilize an online presence to offer products, services, and support to consumers (for, example, customers and potential customers). These continuously occurring online interactions between the organizations and consumers generates vast amounts of streaming data that provides valuable insights for an organization regarding behaviors, habits, attitudes, needs, preferences, and other characteristics of their online consumers. For example, social network data, in-game player behavior, location services and customer actions on websites or in web applications all tend to be ingested as streaming data. Interest and efforts in leveraging the data collected from such data streams is often referred to as the field of "big data" where engineers have begun developing filtering capabilities to be able to filter through a stream of incoming data of potentially unbounded scale, allowing data scientists and engineers to focus on parts of interest. However, since the amount of data received from a data stream is so unwieldy to work with, it is difficult for data engineers to know what filters they should implement, especially since in a streaming setting filters should be set up prior to data ingestion.

SUMMARY

The present disclosure is directed, in part, to improved systems and methods for configuring data stream filtering, substantially as shown and/or described in connection with at least one of the Figures, and as set forth more completely in the claims.

In some embodiments, an improved data stream filtering system and corresponding method for data stream filtering is disclosed that eases the computational burden on computing resources, relative to conventional data stream processing systems, by leveraging a representative sample of a data stream. That is, a selection of filter parameters is applied to sample elements that are approximately representative of current values of the data stream as a whole. To create the initial representative sample, sample elements are created by bootstrapping existing data stored in a data lake, and combining it with real-time samples of the data stream obtained while still in transit to the data lake. This representative sample thus becomes an immediate proxy of the data stream that selected filter parameters can be applied to, in order to compute filter statistics estimates. The representative sample is further refreshed over time with additional real-time samples of the data stream according to a time-weighted algorithm that determines which sample elements are maintained in the representative sample. Some embodiments also include a filter recommendation mechanism. Suggested filter parameters are generated based on a semantic similarity evaluation, a historical correlation with previously implemented data filters, or a combination of both. For the semantic similarity evaluation, the filter recommendation mechanism identifies values in the representative sample that are semantically similar to the one or more filter parameters already specified by the user. For the historical based suggestions, the filter recommendation mechanism refers to a log of historical filter sets and identifies where a historical correlation exists between currently specified filter parameters, and filter parameters that have been specified in the past.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
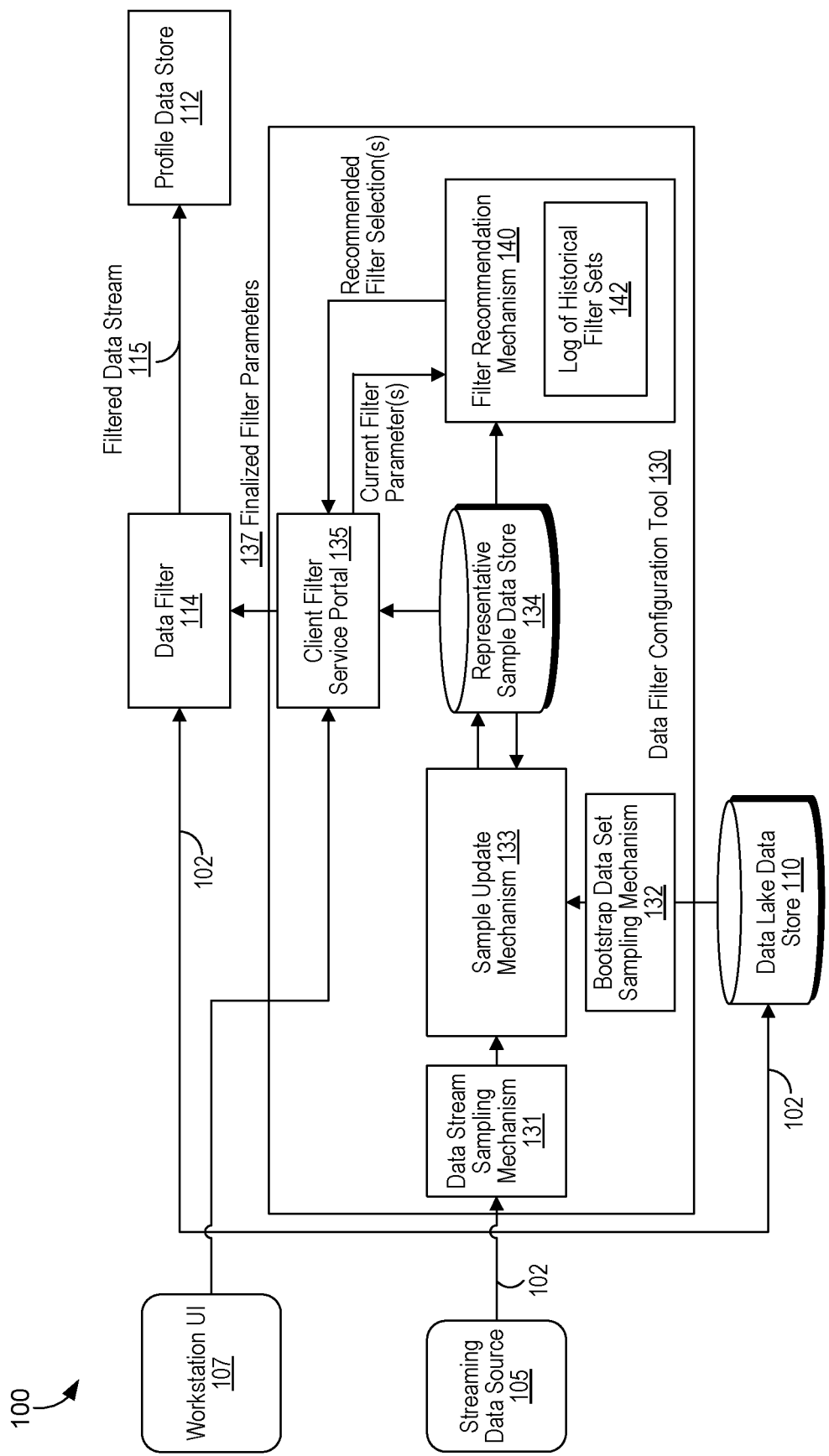
FIG. 1 is a block diagram illustrating an example data stream processing environment, in accordance with embodiments of the present invention.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Conventional systems for processing data carried by data streams are becoming increasingly less effective as a tool for analyzing real time events and data trends, at least in part because of the sheer amount of raw data, and different types of data, now flowing in those streams. While filtering data from the data stream appears initially as a straight forward solution to implement, in practice conventional systems can consume significant processing time, processing power, and memory simply to begin the process of determining how to configure a digital to reject noise while still passing data of interest. For example, social network data, in-game player behavior, location services and customer actions on websites or in web applications all tend to be ingested as streaming data. Interest and efforts in leveraging the data collected from such data streams is often referred to as the field of "big data" where engineers have begun developing filtering capabilities to be able to filter through a stream of incoming data of potentially unbounded scale, allowing data scientists and engineers to focus on parts of interest. However, since the amount of data received from a data stream is so unwieldy to work with, it is difficult for data engineers to know what filters they should implement, especially since in a streaming setting filters should be set up prior to data ingestion.

For example, in some conventional systems, a data engineer will process their data first as a complete dataset and then run a sequence of queries to understand their data completeness, field distributions, and other characteristic data behavior post-filtering. This kind of approach falls short of solving for a number of reasons. For example, the idea of querying a full dataset breaks down once it is considered that the modern datasets can be unbounded in size. Moreover, the iterative sequence of queries that these approaches require is time consuming because it takes time for each iteration of queries to yield analyzable results.

Other conventional systems attempt to provide analytics from the data stream directly, for example combining sampling with a lambda function. But such a process still involves ingesting large amounts of low-relevance data while the data engineer, after many iterations, eventually converges on effective filter settings.

To address these and other problems discussed herein, one or more of the technologies presented in this disclosure provide for, among other things, systems and methods for data stream filtering that ease the computational burden on computing resources by leveraging a representative sample of a data stream to compute estimates of filter statistics to inform a user in determining the desired configuration of a data filter. The processes as detailed in this disclosure yield accurate filter statistics estimates in near real-time, without incurring the costs (in terms of both processing costs and financial costs) that are incurred by conventional systems. The selection of filter parameters is applied to sample elements that are representative of current values of the data stream as a whole. Estimates of filter statistics obtained by applying the selected filter parameters to the representative data set are sufficiently close to the filter statics that would be obtained by applying those selected filter parameters to the actual streaming data. It is therefore unnecessary to ingest substantial amounts of data to realize a data filter. In another aspect, the representative data is also leveraged for the purpose of providing real-time filter parameter suggestions for consideration by the user to supplement those already specified. In embodiments that implement this filter parameter recommendation feature, suggested filter parameters are generated based on a semantic similarity evaluation, a historical correlation with previously implemented data filters, or a combination of both. If the user accepts the recommendation, the system quickly provides the user with revised filter statistics for them to evaluate and decide whether to utilize the recommended parameters.

FIG. 1 is a diagram illustrating an example embodiment of a data stream processing environment 100. As shown in FIG. 1, the data stream processing environment 100 receives an incoming dataset stream 102 comprising a data stream from a streaming data source 105. The dataset stream 102 comprises records for a data stream that forms an ordered collection of events and data associated with one or more monitored transactions. In this example, the records of the data stream are formatted as Kafka structured topics. The data stream is of any length, up to and including being boundless. It should be understood that Kafka structured topics are just one example of a data stream structure. In other implementations, the records of the data stream are defined by other data stream structures. As shown in FIG. 1, the received data stream flows into a data lake data store 110, which comprises a central data store that archives the records of the data stream, for example in its native, raw, format either in a structured or unstructured form. Accordingly, data lake data store 110 is also referred to herein as the data lake data store 110.

Also as shown in FIG. 1, records for the data stream also flow into a profile data store 112. The profile data store 112 comprises a client accessible database or other form of data store populated with data from the data stream that is of particular importance or relevance to a client. For example, in some implementations, the profile data store 112 provides the client with the ability to understand the online behaviors of their own clients, both historical behaviors and current real-time behaviors. In some implementations, the client that utilizes the profile data store 112 is also the owner or operator of the streaming data source 105, or otherwise has a proprietary interest in the data stream as delivered via the incoming dataset stream 102.

In the embodiment shown in FIG. 1, the profile data store 112 is a database resident on the data stream processing environment 100. However, in other example embodiments the profile data store 112 is a database hosted on a platform external to the data stream processing environment 100, such as on a server owned by the client that utilizes the data stream processing environment 100 to populate the profile data store 112, for example. Once the records from the data stream are stored to the profile data store 112, the client is able to perform analysis of their choosing on the ingested data.

It should be appreciated that a substantial amount of data within the data stream as received by the data stream processing environment 100 is data that is not necessarily useful to the client. In some implementations, the client utilizing the data stream processing environment 100 is paying for use of the system on the basis of the amount of data ingested to the profile data store 112. If the data stream were applied directly to the profile data store 112 and ingested unfiltered, that client would be paying for ingesting data that is not providing them with value. For example, a typical data set from a data stream includes within data from an online consumer interaction such extraneous information as speed of scrolling and mouse position on the screen, in addition to potentially meaningful data such as consumer entered information, search criteria, selections, completed transactions, and the like.

Accordingly, data stream processing environment 100 further comprises a data filter 114 that is configurable by the client to selectively exclude data from the data stream from being passed to the profile data store 112. This filtered output comprising the filtered data stream 115 from the data filter 114 thus reduces the total amount of data ingested into the profile data store 112, which also serves to assist in enhancing the quality of segmentation in the client's results. That said, there are still drawbacks to implementations of filtering that involve the client first ingesting data into their profile data store 112 in order to analyze the results of the filtering, in order to then assess what filters work for them. More specifically, the client incurs what is potentially substantial costs of ingesting unnecessary data while performing the process of converging on a desired set of filter parameters.

Moreover, because patterns in the data of the data stream are dynamically changing, those costs will be incurred repeatedly as the data filter parameters are periodically readjusted to account for changing data patterns. Furthermore, because of the time based nature of the data being received in the form of a data stream, algorithms designed to compute filter statistics from streaming data (such as the proportion of filtered records or a filtered field frequency distribution, for example) are designed to iteratively converge on results over time. The calculations often take time on the order of hours to run and arrive at filter statistics that a data engineer (or other user adjusting the data filter 114 settings on behalf of the client) would evaluate to determine if their filter selections are effective in allowing the relevant high-value target data to pass to the profile data store 112 while blocking the passage of low-value data, and/or then determine how to further adjust the data filter 114 to better define what goes into the profile data store 112.

The computation of filter statistics on a data filter 114 applied to the data stream are also processor and memory intensive, consuming the computing resources of the data stream processing environment 100 for the duration of time that the computations are being executed. Those substantial computing resources are being consumed prior to obtaining assurance that the data filter 114 as implemented will actually be effective in outputting meaningful data, thus compromising the overall efficiency of the underlying computing system.

Accordingly, the data stream processing environment 100 further comprises a streaming data filter configuration tool 130 that is executed within the data stream processing environment 100. The streaming data filter configuration tool 130 generates and leverages a finite length representative sample from which filter statistics are estimated in real time for a set of filter parameters selected by a user. The representative sample produced by the streaming data filter configuration tool 130 is a hybrid data sample set in the sense that it is produced from a combination of newer samples fresh from the data stream as it is being received, and relatively older samples of previously stored data from the data stream. This hybrid data sample set defines the representative sample that is utilized to compute filter statistics estimates that describe the results that selected filter parameters are expected to have when applied to the live data stream, as further explained in detail below. This technique as described herein is applicable to implementations where the data stream comprises a continuous flow of arriving data, or to an implementation where the data stream comprises distinct data sets that are periodically streamed into the data stream processing environment 100.

The streaming data filter configuration tool 130 thus facilitates user adjustment of filter parameters while avoiding the costs of data ingestion while adjusting the filter parameters. It is notable that prior available solutions drawn to filtering streaming data fail to: provide the ability to obtain filter estimates for assessing data filter effectiveness prior to applying the filter to streaming data; provide the ability to obtain filter estimates utilizing systematically refreshed representative samples; or provide a mechanism for producing filter parameter suggestions based on such systematically refreshed representative samples. Some prior available solutions do not provide filter statistical estimates at all due to the inherent difficultly of making such computations for streaming data.

As shown in FIG. 1, the streaming data filter configuration tool 130 comprises a data stream sampling mechanism 131, a bootstrap data set sampling mechanism 132, a representative sample maintenance mechanism 133, a representative sample data store 134, and a client filter service portal 135. A client workstation comprising a user interface (UI), referred to as the workstation user interface 107, is coupled to the client filter service portal 135 and provides an interface from which a user (such as a data engineer for the client, for example) can enter one or more filter parameters for input to the client filter service portal 135, receive a display of filter statistic estimates from the client filter service portal 135, and input instructions to the client filter service portal 135 to apply finalized filter parameters 137 to the data filter 114. In some embodiments, the streaming data filter configuration tool 130 also optionally comprises a filter recommendation mechanism 140. The filter recommendation mechanism 140 evaluates the one or more filter parameters currently entered into the client filter service portal 135 and provides an output of one or more filter parameter suggestions to the client filter service portal 135, which are displayed to the user via the workstation user interface 107. In this example, filter recommendation mechanism 140 is also coupled to the representative sample data store 134 and generates the one or more filter parameter suggestions based on a semantic similarity evaluation of sample elements of the representative sample and the one or more filter parameters. In other examples, the filter recommendation mechanism 140 obtains the representative sample directly from the client filter service portal 135. In some embodiments, the filter recommendation mechanism 140 comprises or is otherwise coupled to a log of historical filter sets 142 which is also utilized for generating the one or more filter parameter suggestions.

To generate the initial representative sample, the sample update mechanism 133 utilizes a combination of sample elements created from already existing data stored in the data lake data store 110 and real-time samples of the data stream obtained while still in transit to the data lake data store 110. Using this combination of the two samples, the initial representative sample is created and stored into the representative sample data store 134 for subsequent retrieval and utilization by the client filter service portal 135. The streaming data filter configuration tool 130 is thus able to jumpstart the computation of filter statistics estimations. The sample update mechanism 133 also maintains the freshness of the representative sample by updating the representative sample using fresh sample elements sampled directly from the streaming data.

The bootstrap data set sampling mechanism 132 is the component of the streaming data filter configuration tool 130 that produces a bootstrapped sample from the data records of the data stream that have already flowed into the data lake data store 110 and provides that bootstrapped sample to the sample update mechanism 133 for inclusion in the initial representative sample. In one embodiment, the bootstrap data set sampling mechanism 132 uses a systematic sampling approach that produces a bootstrapped sample of size X/n, with X being the size of the dataset associated with the data stream stored in the data lake data store 110, and n is a user configurable uniform sampling interval. For example, for generating a sample of 50 records from a dataset of 1000 records, X=1000 and n=5 so that every fifth record in the data lake dataset is chosen for the bootstrapped sample. This approach produces samples by providing a trade-off between computational efficiency and representativeness of the original data. In one implementation, samples of the data stream are read from a data landing zone where data is queued for transfer into the data lake to generate the bootstrapped sample. This approach is more computationally efficient than other sampling approaches such as random sampling but provides a similar average variance across the samples created. That said, other sampling techniques, including random sampling, are valid options for generating the bootstrapped sample.

The data stream sampling mechanism 131 is the component of the streaming data filter configuration tool 130 that produces sample elements of the data stream directly from real-time streaming data. The sample update mechanism 133 inputs these streaming data sample elements to augment and update the bootstrapped sample to maintain freshness of the representative sample used for filter statistics estimation. Similar to the systematic sampling approach used above, the incoming streaming data is sampled by the data stream sampling mechanism 131 at uniform intervals of size n. This sampling operation is performed on a live data stream, meaning that the data that it actively being streamed into the data lake data store 110, in contrast to the bootstrapped sample which is generated by sampling at rest data that has already landed for storage in the data lake data store 110. The streaming nature of this process makes it computationally efficient as compared to other sampling approaches because only a very small subset of data is operated upon at a given moment. The sample elements generated by the data stream sampling mechanism 131 are used by the sample update mechanism 133 to augment the bootstrapped samples in the representative sample and continuously add new sample elements to the representative sample to maintain freshness and increase the robustness of the computed filter statistics estimates against changing data patterns.

It should be noted that in many instances the incoming dataset stream 102 comprising the data stream of interest to the client will in fact comprise multiple data streams for multiple tenants, and the data stream processing environment 100, in turn, ingesting data for multiple datasets at any given moment. Therefore, the data stream processing environment 100 maintains an in-memory construct which maintains the sample membership criteria for each individual dataset, and each representative sample, for each tenant. This allows the data stream processing environment 100 to evaluate individual records against this membership criteria effectively segmenting the stream of events into multiple samples. For example, the user at the workstation user interface 107 would specify to the client filter service portal 135 which data stream is to be filtered, and a representative sample with a corresponding membership criteria would be accessed from the representative sample data store 134.

The sample update mechanism 133 is the component of the streaming data filter configuration tool 130 that prepares the initial representative sample and maintains the freshness of the representative sample stored in the representative sample data store 134. As discussed above, the sample update mechanism 133 continuously samples the data stream to obtain fresh sample elements for the representative sample. However, if the representative sample were permitted to increase in size without limit, that would inevitably slow down the filter statistics estimation algorithms and defeat the purpose of sampling directly from the data stream in the first place. Therefore, to maintain a trade-off between sampling accuracy and estimation performance the sample update mechanism 133 applies a time-weighted algorithm to determine which sample elements are maintained in the representative sample.

Because streaming data is varied in size and nature, it is not always possible to have a set sample size which would provide reliable estimates for each data stream. Keeping this in consideration, the sample update mechanism 133 provides a way to control the size of the representative sample. More specifically, the sample update mechanism 133 utilizes two parameters, t (a time threshold parameter), and p (a picking probability or proportion parameter) for continuously tuning the size of the representative sample. For example, in one embodiment, the sample update mechanism 133 applies a timestamp to each sample element of the representative sample indicating a time at which the sample element was added to the representative sample. All sampled elements of the representative sample with a timestamp after the time parameter, t, are kept as part of the updated representative sample. All elements before the time parameter, t, are chosen probabilistically with a probability, p, of being maintained as part of the updated representative sample. The resulting updated representative sample can be thus be tuned to reflect the recentness of the data while maintaining some level of variance from the combination of original bootstrapped sample and the constantly updating streaming sample elements.

As the representative sample size increases, reducing its size using traditional methods or keeping a set sample size regardless of the total size of the inbound data can introduce unforeseen changes to estimation accuracy with respect to new data. Using the sample update mechanism 133 instead of a deterministic time-to-live (TTL) based approaches mitigates concerns such as a complete loss of representativeness of old data and a resulting drastic drop in confidence of estimates performed using the representative sample. Dynamically configurable sample updates provide a mechanism to manage the margin of error in the estimations. Probabilistic membership via the probability parameter, p, effectively reduces sample size by dropping part of older sample elements. The sample update mechanism 133 does introduce some bias towards more recent data but this is an advantageous characteristic for application to streaming systems because the data filter 114 operates on constantly changing data and filter statistic estimations are more valuable when they stay in line with the most recent data distributions.

The client filter service portal 135 is the component of the streaming data filter configuration tool 130 that executes computation of the filter statistics estimates by applying the one or more filter parameters to the representative sample, communicates those filter statistics estimates to the user via the workstation user interface 107, and applies the finalized filter parameters 137 to the data filter 114 upon approval of the one or more filter parameters by the user via the workstation user interface 107. In some embodiments, the client filter service portal 135 host a world-wide-web (WWW) service or similar website server to which the user of the workstation user interface 107 logs in to access the services of the data stream processing environment 100. In other implementations, the client filter service portal 135 hosts server applications with which the workstation user interface 107 interacts via a client application.

Figure 2:
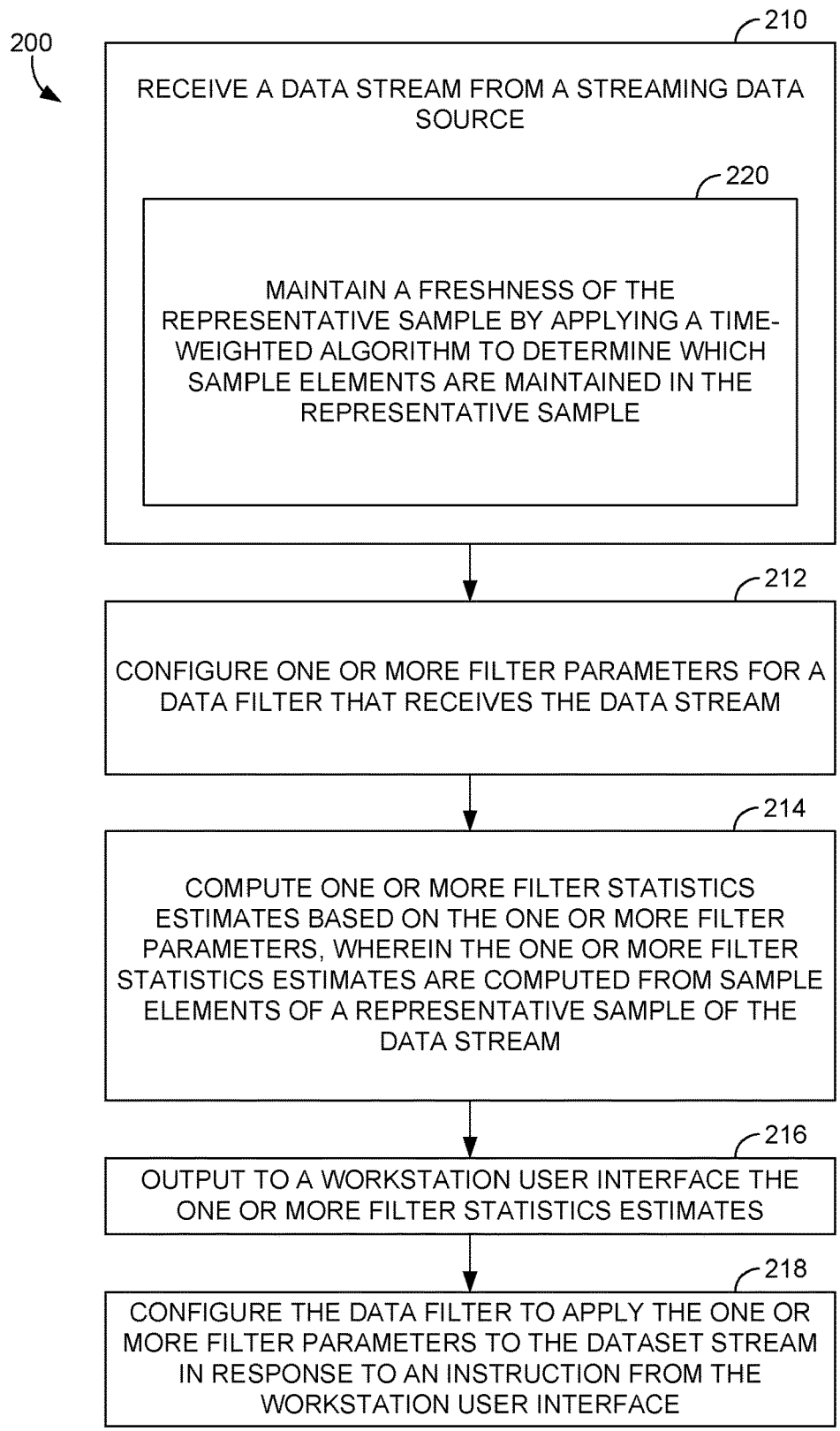
FIG. 2 is a flow chart illustrating an example method embodiment for data stream processing.

In order to illustrate an example process implemented by the data stream processing environment 100, FIG. 2 comprises a flow chart illustrating a method 200 embodiment for data stream processing. It should be understood that the features and elements described herein with respect to the method 200 of FIG. 2 may be used in conjunction with, in combination with, or substituted for elements of, any of the other embodiments discussed herein and vice versa. Further, it should be understood that the functions, structures, and other descriptions of elements for embodiments described in FIG. 2 may apply to like or similarly named or described elements across any of the figured and/or embodiments described herein and vice versa. In some embodiments, elements of method 200 are implemented utilizing the data stream processing environment 100 disclosed above.

The method 200 begins at 210 with receiving a data stream from a streaming data source. The data stream, in some embodiments, is a component of an incoming dataset stream received at a data stream processing environment. At 212, one or more filter parameters for a data filter that receives the data stream are configured. As discussed above, in some embodiments, a client filter service portal of the data stream processing environment communicates the one or more filter parameters from a user via a workstation user interface. At 214, the method proceeds with computing one or more filter statistics estimates based on the one or more filter parameters. The one or more filter statistics estimates are computed from sample elements of a representative sample of the data stream. As explained above, the representative sample is a hybrid data sample set that comprises a combination of: a first set of sample elements of the data stream sampled from the data stream; and a second set of sample elements of the data stream sampled from the data stream prior to sampling the first set of sample elements, or sampled from records from a data lake data store. At 216, the computed filter statistics estimates are output to the workstation user interface for display to the user. The method at 212, 214 and 216 is repeated in an interactive manner until a user of the workstation user interface is satisfied with the filter statistics estimates at which point they input their approval of the one or more filter parameters to become the finalized filter parameter. Then, in response to an instruction from the workstation user interface indicating approval of the one or more filter parameters, the method proceeds to 218 with configuring the data filter to apply the one or more filter parameters to the data stream in response to an instruction from the workstation user interface. The method 200 may further include a sub-process for generating filter parameter suggestions, which is discussed in detail below.

In some embodiments, the method 200 also includes maintaining a freshness of the representative sample (shown at 220) by applying a time-weighted algorithm to determine which sample elements are maintained in the representative sample. This maintenance feature may be executed in parallel to other segments of method 200. For example, in some implementations, the maintenance feature at 220 is performed continuously such that each time new filter parameters are obtained (e.g., at 212), the filter statistics estimates (e.g., at 214) are performed using an updated representative sample.

Figure 3:
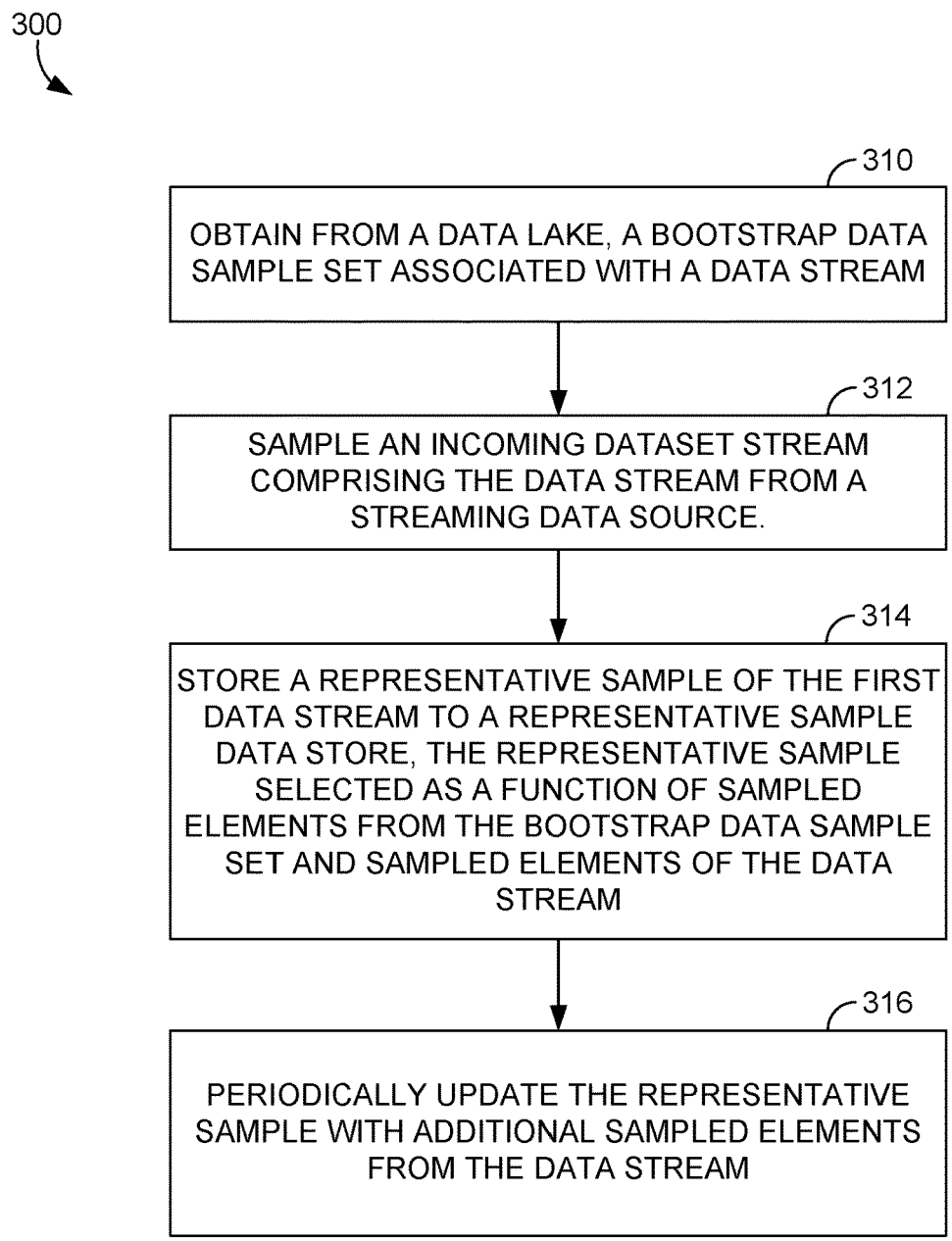
FIG. 3 is a flow chart illustrating an example method embodiment for generating and updating a representative sample.

FIG. 3 comprises a flow chart illustrating a method 300 embodiment for an example process implemented by the sample update mechanism for generating and updating the representative sample. It should be understood that the features and elements described herein with respect to the method 300 of FIG. 3 may be used in conjunction with, in combination with, or substituted for elements of, any of the other embodiments discussed herein and vice versa. Further, it should be understood that the functions, structures, and other descriptions of elements for embodiments described in FIG. 3 may apply to like or similarly named or described elements across any of the figured and/or embodiments described herein and vice versa. In some embodiments, elements of method 300 are implemented utilizing the data stream processing environment 100 disclosed above.

The method 300 begins a 310 with obtaining from a data lake, a bootstraped sample set associated with a data stream. The bootstraped data set sampling mechanism produces the bootstrapped sample from the data records of the data stream that have already flowed into the data lake data store, and provides that bootstrapped sample to the sample update mechanism for inclusion in the initial representative sample. In one embodiment, the bootstrap data set a systematic sampling approach is used that produces a bootstrapped sample of size X/n, with X being the size of the dataset associated with the data stream stored in the data lake data store, and n is a user configurable uniform sampling interval. Other sampling techniques, including random sampling, are valid options for generating the bootstrapped sample.

The method 300 proceeds to 312 with sampling an incoming dataset stream comprising the data stream from a streaming data source. The sample update mechanism inputs these streaming data sample elements to augment and update the bootstrapped sample to maintain freshness of the representative sample used for filter statistics estimation. Similar to the systematic sampling approach used above the incoming streaming data is sampled at a uniform intervals of size n. This sampling operation is performed on a live data stream, meaning that the data is actively being streamed into the data lake data store, in contrast to the bootstrapped sample which is generated by sampling at rest data that has already landed for storage in the data lake data store.

The method proceeds to 314 with storing a representative sample of the data stream to a representative sample data store. The representative sample is selected as a function of sampled elements from the bootstrap data sample set and sampled elements of the data stream from the incoming dataset stream.

To keep the representative sample fresh, the method 300 proceeds to 316 with periodically updating the representative sample with additional sampled elements of the data stream from the incoming dataset stream. This feature at 316 is thus equivalent to the maintenance feature at 220 of method 200 discussed above. The sample update mechanism samples the incoming dataset stream to add new samples of the data stream to the representative sample. In some embodiments, a time-weighted algorithm to determine which sample elements are maintained in the representative sample. Sample elements of the representative sample having a timestamp indicating that the sample was obtained after a threshold time are maintained in the representative sample, and sample elements of the representative sample having a timestamp indicating that the sample was obtained prior to the threshold time are removed from the representative sample, based on either a probability parameter or a proportion parameter. The initial representative sample can be obtained by systematically sampling the data stream, and by systematically sampling records of the of the data stream retrieved from the data lake data store (i.e., a bootstrapping sample).

Figure 4:
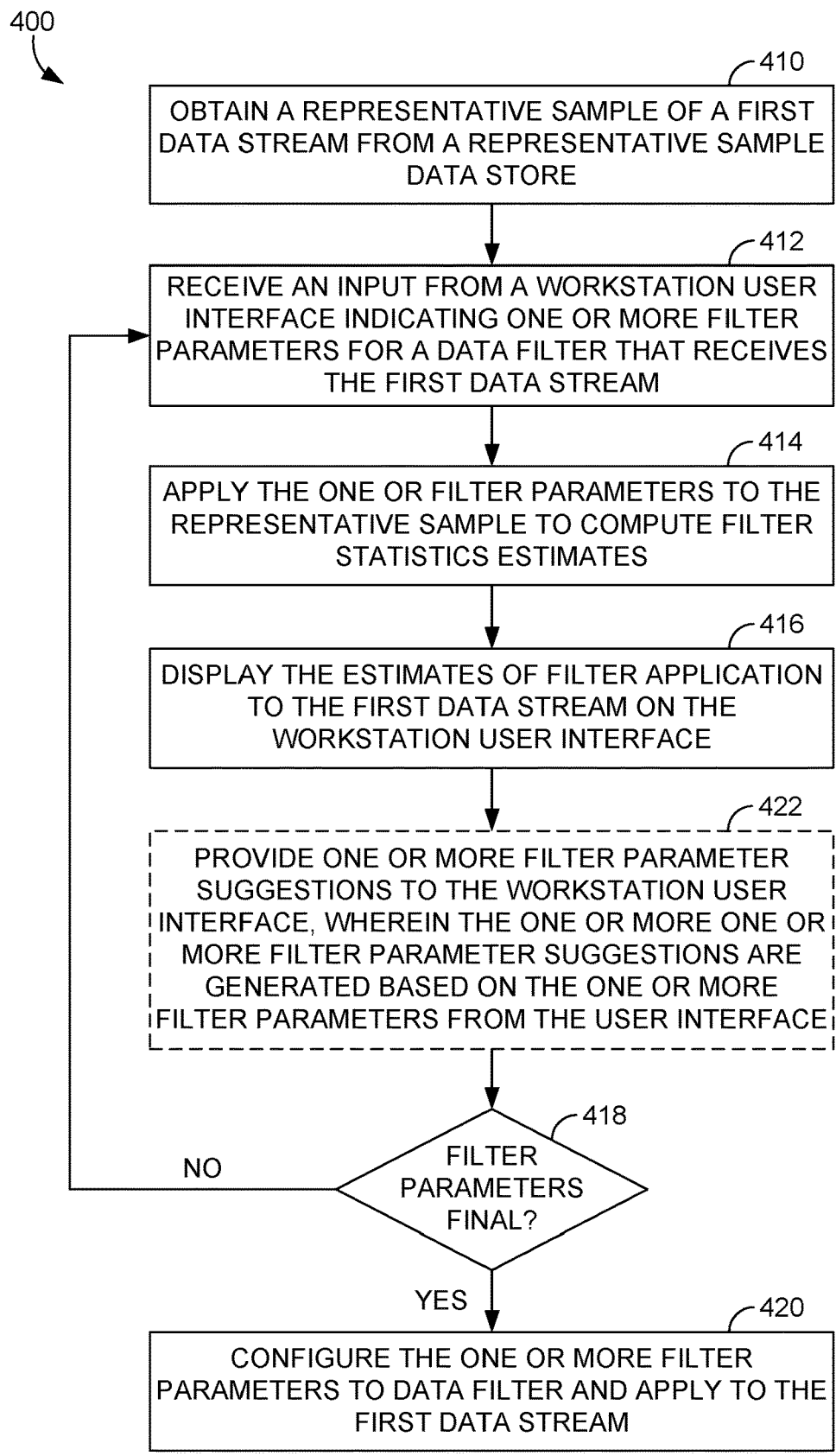
FIG. 4 is a flow chart illustrating an example method embodiment for computing filter statistics estimates.

In order to illustrate an example process for computing filter statistics estimates, FIG. 4 comprises a flow chart illustrating a method 400 embodiment. It should be understood that the features and elements described herein with respect to the method 400 of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figured and/or embodiments described herein and vice versa. In some embodiments, elements of method 400 are implemented utilizing the data stream processing environment 100 disclosed above.

The method 400 begins at 410 with obtaining a representative sample of a data stream from a representative sample data store. In one example implementation, a user at a workstation user interface selects the data stream as the data stream targeted for filtering, and the workstation user interface communicates that selection to the data stream processing environment. The client filter service portal then obtains from the representative sample data store the representative sample associated with the data stream selected by the user. For example, a representative sample with a corresponding membership criteria would be obtained from the representative sample data store.

The method 400 proceeds to 412 with receiving an input from the workstation user interface indicating one or more filter parameters for a data filter that receives the data stream. For example, a client workstation comprising a user interface is coupled to the client filter service portal and provides an interface from which a user (such as a data engineer for the client, for example) can enter one or more filter parameters for input to the client filter service portal. These are filter parameters that the user is considering for use with the data filter for filtering the data stream. However, instead of actually applying those selected filter parameters directly to the data stream to evaluate the effectiveness of the selected parameters, the method proceeds to 414 with applying the one or filter parameters to the representative sample to compute filter statistics estimates. These filter statistics estimates represent an approximation of the filter statistics the user can expect to obtain if they were to apply the selected one or more filter parameters to the actual data stream. The method thus proceeds to 416 with outputting to the workstation user interface the one or more filter statistics estimates so that the results are displayed to the user. If the user enters a further adjustment to the filter parameters, the method returns to 412, 414 and 416 to again compute and display filter statistics estimates from the updated filter parameters. When the process indicates that the filter parameters are final (checked at 418), the method 400 proceeds to 420 where those final one or more filter parameters are configured into the data filter and applies to the data stream. In some embodiments, the method also includes providing one or more filter parameter suggestions to the user interface (shown at 422). Those one or one or more filter parameter suggestions are generated based on the one or more filter parameters from the user interface.

Figure 5A:
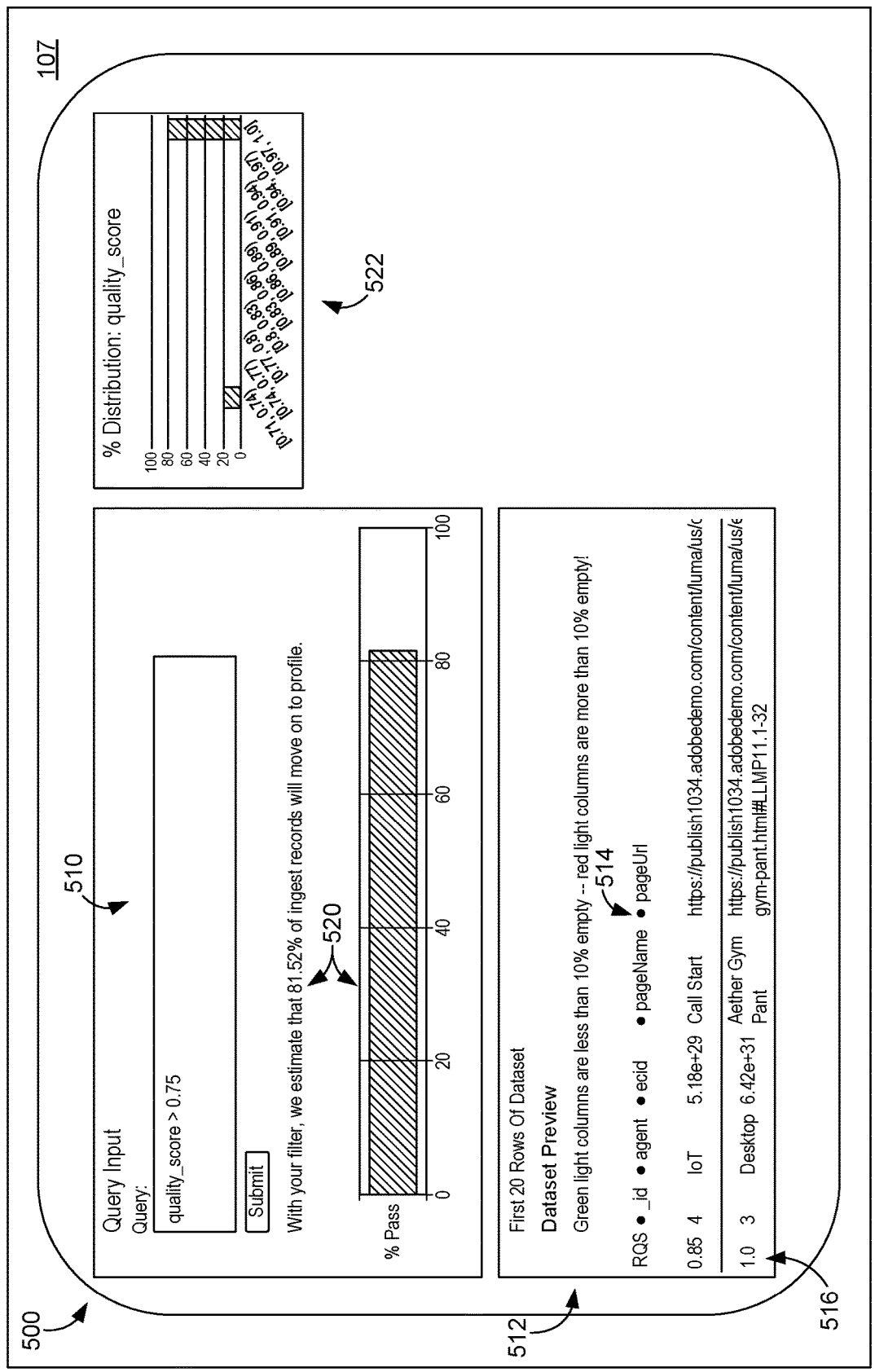
FIGS. 5A and 5B are figures illustrating example displays generated by a client filter service portal at a workstation user interface, in accordance with embodiments of the present invention.

FIG. 5A is a diagram illustrating an example display 500 at the workstation user interface 107 generated by the client filter service portal. As shown in FIG. 5A, the display 500 at the workstation user interface includes at least one query input field 510 wherein the user can input the one or more filter parameters for evaluation. The workstation user interface 107 includes at least one form of human-machine interface (HMI) technology that the user utilizes to input information into the workstation user interface 107 (such as, but not limited to a keyboard, keypad, touchscreen, mouse, trackpad, or similar device). In the illustration of display 500, the example filter parameters illustrated in the query input field 510 are entered in the form of Process Query Language (PQL) syntax. However, the use of PQL is for illustration purposes only as it is contemplated that any language for querying objects may be utilized in other implementations. For example, Structure Query Language (SQL) or SQL-like languages are used in other implementations to enter the one or more filter parameters that will be input to the client filter service portal 135.

Display 500 also includes one or more output fields with which the client filter service portal 135 displays results to the user. For example, the dataset preview field 512 displays a preview comprising a predetermined number of records (e.g., rows) from the representative sample of the data stream as filtered using the one or more filter parameters entered into the query input field 510. The dataset preview field 512 thus permits the user to obtain at least an initial assessment of the nature of the data carried by the selected data stream.

In some embodiments, the client filter service portal in generating the dataset preview field 512 augments the information with data quality indications. For example, with respect to each of the particular fields of the records (e.g., the columns of the displayed preview) a field quality indicator (shown at 514) indicates the degree to which a field is populated (i.e., not null) for each record. For example, the user may assess whether it is effectiveness to apply a filter parameter to a particular filed based on whether that field has a relatively higher or lower number of null entries. Another data quality indication is a record quality score (RQS, shown at 516) that indicates the proportion of fields for that record that are not null. For example, in FIG. 5A, the user has entered into the query input field 510 a filter parameter for quality_score >0.75 such that the filtered results will only include records having more than 75% of their fields populated with data.

Other output fields included on display 500 provide the results of the computed filter statistics estimates. For example, the display outputs to the user the filter statistics estimate for the proportion of filtered records (shown at 520), which is an estimation of the proportion of records of the data stream that will be passed by the data filter 114 to the profile data store 112, verse the proportion of records that will be stopped from passing. In this example, the proportion of filtered records 520 indicates that with the currently selected filter parameters, 81.52% of the records of the ingested data stream will pass. Another filter statistics estimate computed by the client filter service portal 135 is the field distribution (shown at 522). The field distribution 522 is a filter statistic that indicates the distribution of data in the particular fields specified for filtering by the one or more filter parameters. In this example, the field distribution 522 indicates that about 20% of the records in the representative sample have a value in the quality_score between 0.71 and 0.74, while about 80% of the records have a value between 0.97 and 1.0. This distribution indicates that the user can select a filter parameter for quality_score of any value between 0.74 and and effectively achieve the same filtering. The filter statistics estimate are highly useful because the end user is attempting to eliminate data that is essentially noise from being ingested into the profile data store 112. The filter statistics estimates helps them understand that they are not only filtering out such noise, but also provide assurance that the data of interest is also not being filtered out. In one example scenario, a data stream mostly includes human behavioral data and transactions (for example, people performing various tasks online) but also includes bots pretending to be humans. The filter statistic estimates can assist the user in discerning how much of the data stream represents human behavior vs how is bot behaviors.

Figure 5B:
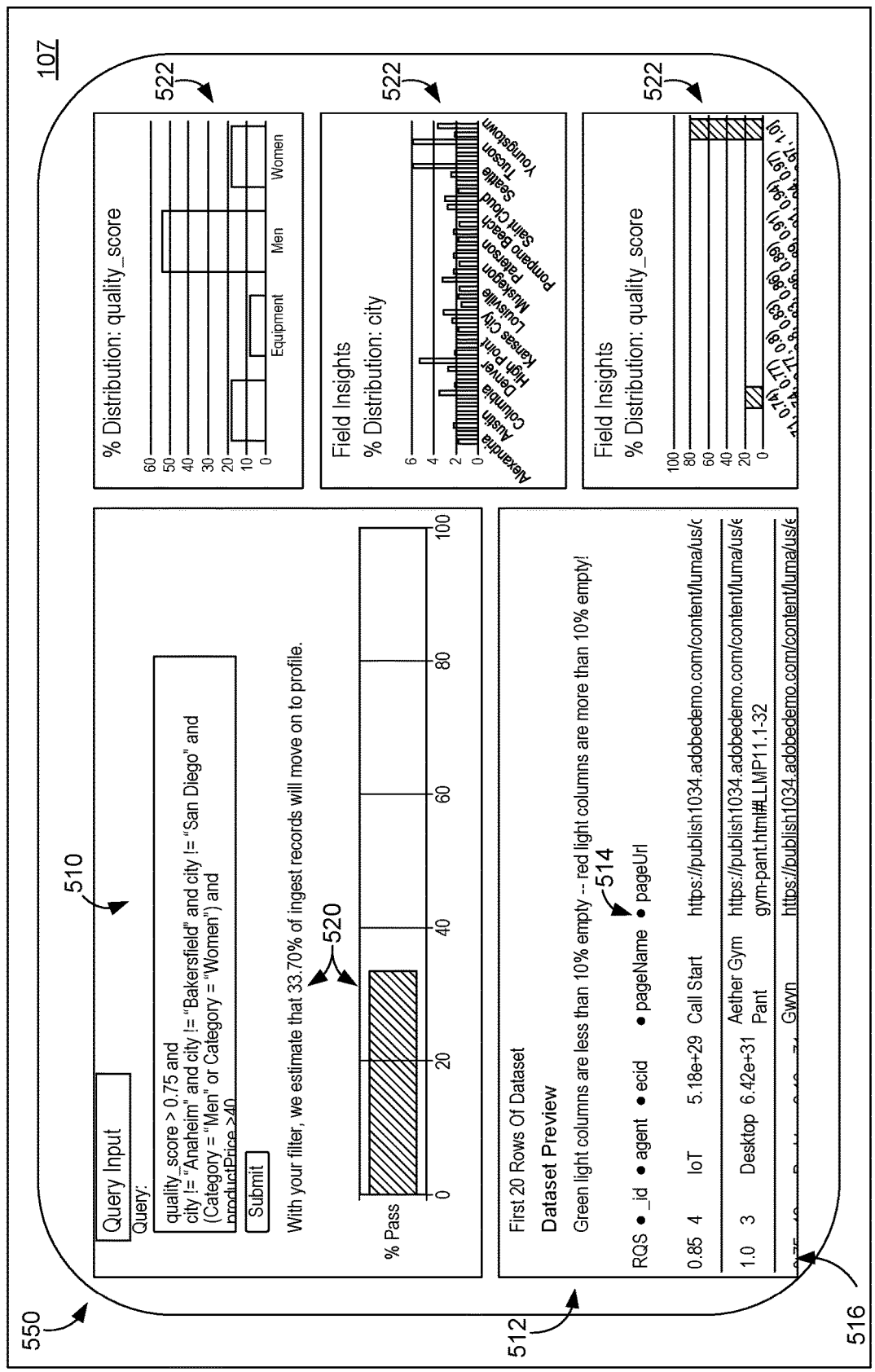

Referring now to FIG. 5B, the user has now added to into the query input field 510 additional filter parameters for the data fields of "city", "Category", and "productPrice". This updated set of filter parameters are input to the client filter service portal 135, recomputed based on the representative sample (which has since refreshed since the query of FIG. 5A), and updated filter statistic estimates 520, 522 immediate updated. For example, the proportion of filtered records 520 now indicates that with the currently selected filter parameters, 33.70% of the records of the ingested data stream will pass and additional field distributions are shown at 522 for the fields specified in the new filter parameters. These filter statistics estimates 520, 522 are adjusted in real time (for example, in less than one second) as the filter parameters are adjusted, so that the user can fine tune the selected filter parameters to obtain the desired distribution and percent of rows/records excluded prior to inuring costs of data ingestion. The estimated results are generated with low latency because they are computed from the representative sample rather than from actual data stream, and are of high accuracy because the representative sample itself is updated using fresh sample elements sampled from the data stream in real time. As the user evaluates their selected filter parameters based on estimated result, to avoid frequent network calls to the representative sample data store 134, in some embodiments, the representative sample is cached at the client filter service portal 135.

As previously mentioned, in some embodiments the streaming data filter configuration tool 130 further comprises a filter recommendation mechanism 140 that generates one or more filter parameter suggestions based on the one or more current filter parameters selected by the user. As the user operating the workstation user interface begins to think about how to manipulate the one or more filter parameters to capture the data most relevant to them, they may not yet have a clear understanding of the contents and structure of the data carried by the data stream, because it has so many fields within the range of data types. For example, fields for location may contain hundreds of different values that cannot be easily bound by ranges in the way numeric files can, and also may contain freeform text entries that do not adhere to a defined structure or established vocabulary. The filter recommendation mechanism 140 therefore functions to generate filter parameter suggestions that match the user's apparent use case to provide further assistance during the filter creation workflow.

In one embodiment, the filter recommendation mechanism 140 identifies values in the representative sample that are semantically similar to the one or more filter parameters already specified by the user. For example, when the filter parameters specify to filter using a value of "California" on a location field, the filter recommendation mechanism 140 evaluates from the representative sample, what other values in the data set are used to specify location the might be equivalent. In this case, "CA", "CAL.", "CALI", "CAL STATE", are all terms that look and/or sound similar to "California". They are semantically similar values from the sample set. This type of semantically based suggestion is particularly applicable for fields where there is freeform text and/or where a standardize version of an entry would augment the literal contents of the current filter parameters.

Figure 6:
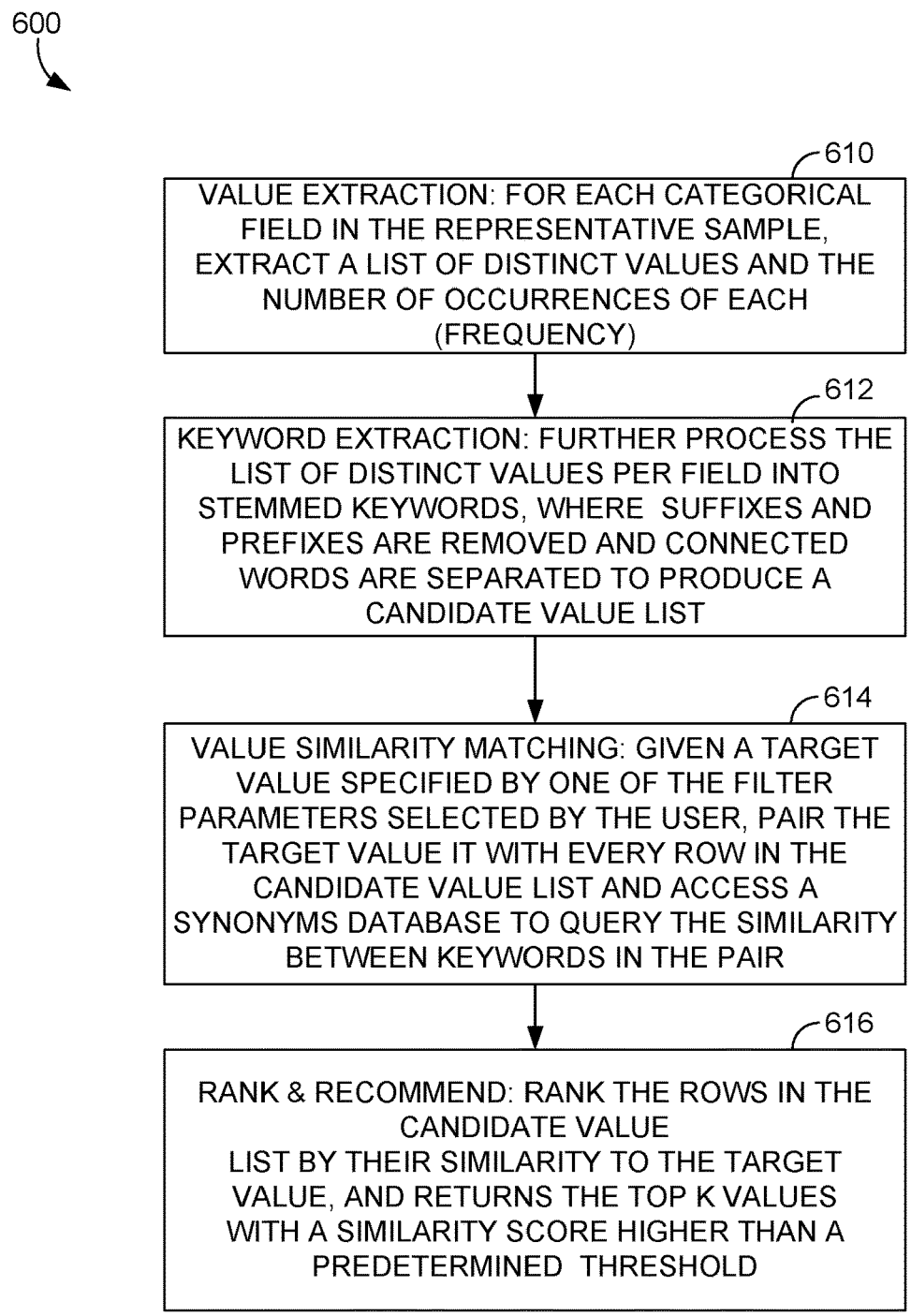
FIG. 6 is flow diagram illustrating an example method embodiment for generating semantically similar filter parameter suggestions.

An example algorithmic process for providing semantically similar filter parameter suggestions is illustrated by method 600 in FIG. 6. It should be understood that the features and elements described herein with respect to the method 600 of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 600 are implemented utilizing the data stream processing environment 100 disclosed above.

The method 600 begins at 610 with value extraction, where for each categorical field (e.g., column) in the representative sample, the filter recommendation mechanism 140 extracts a list of distinct values and the number of occurrences of each (frequency). This extraction produces a distinct value list that associates each distinct value with frequency (e.g., value, frequency) per field, with the items in the distinct value list ranked by frequency. The method 600 proceeds to 612 with keyword extraction where the filter recommendation mechanism 140 further processes the list of distinct values per field into stemmed keywords, where suffixes and prefixes are removed and connected words are separated. For example, a value of "yoga pants" in a product name column are separated to will become two distinct values of "yoga" and "pant". The each item on the distinct value list is extended to include value, frequency and keywords, and is utilized as a candidate value list.

The method 600 proceeds to 614 with value similarity matching, where given a target value specified by one of the filter parameters selected by the user, the filter recommendation mechanism 140 pairs it with every row in the candidate value list and access a synonyms database to query the similarity between keywords in the pair. As an example, in one implementation the filter recommendation mechanism 140 accesses the WordNet database (or similar synonym database) which scores the cognitive similarity of a set of keywords. For example, a score of 0 means the two values are not similar, while a score of 1 means the two values are very similar. The method 600 then proceeds to 616 with rank & recommend, where the filter recommendation mechanism 140 ranks the rows in the candidate value list by their similarity to the target value, and returns the top K values with a similarity score higher than a predetermined threshold (e.g., 0.8). The user at the workstation user interface would then be able to optionally select one or multiple recommendations and include in their one or more filter parameters at their discretion.

In another embodiment, the filter recommendation mechanism 140 identifies values in the current one or more filter parameters that correlate to filter parameters identified from the log of historical filter sets 142. The historical log data comprising filter parameters accumulated from previously executed data filter logs. For example if current filter parameters specifies a location of "Bay Area", the filter recommendation mechanism 140 look at the historical log data to say that prior users who specify this location often also specify filter parameters for job title as "engineer". That is, the filter recommendation mechanism 140 recognizes a strong correlation between the use of the term "Bay Area" and "engineer" in the historical log data.

Figure 7:
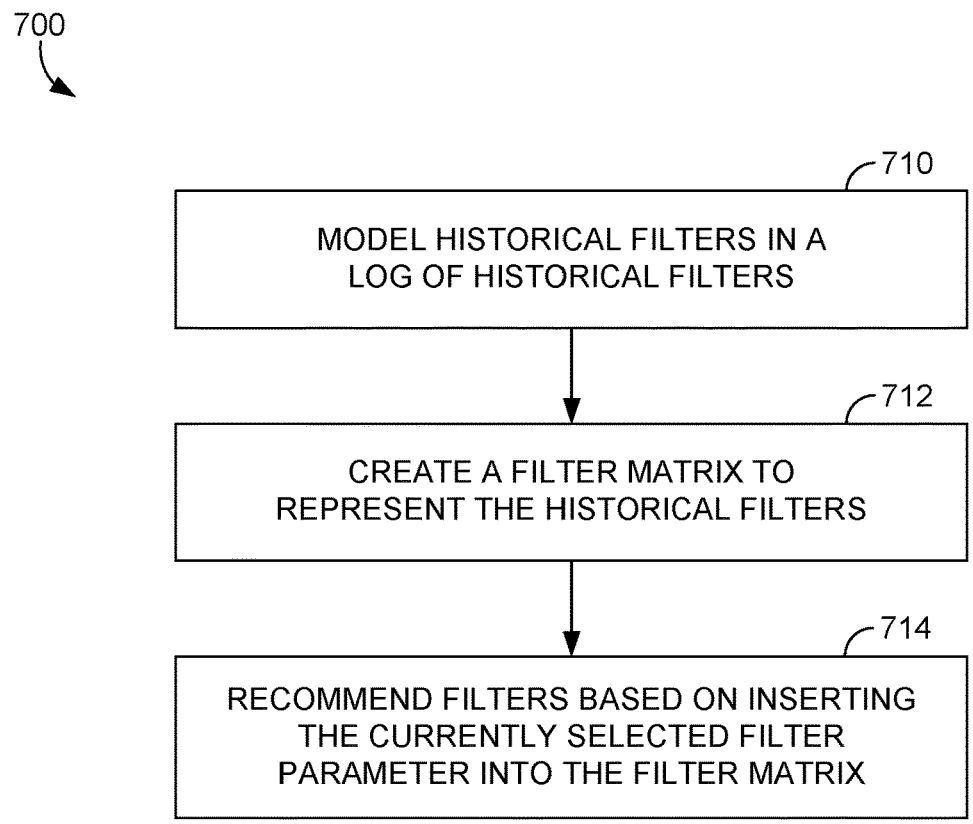
FIG. 7 is a flow diagram illustrating an example method embodiment for providing historically based filter parameter suggestions.

An example algorithmic process for providing historically based filter parameter suggestions is illustrated by method 700 in FIG. 7. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figured and/or embodiments described herein and vice versa. In some embodiments, elements of method 700 are implemented utilizing the data stream processing environment 100 disclosed above.

The method 700 begins at 710 with modeling historical filters. Each row in the log of historical filters contains a set of filters that have been specified together in a past data filtering session. As an example, of a row log of historical filters that includes: ({column: "location", value: "bay area"}, {column: "job title", value: "engineer"}) indicates that these filter parameters have been specified together in the past. The method proceeds to 712 with creating a filter matrix to represent the historical filters, where each row represents a filtering job (J), and each column represents a filter (F). The cells of the filter matrix indicate whether a filter parameter was specified in for a prior data filter (e.g., 1 is used, 0 is not used). The method proceeds to 714 with recommending filters. Given the filter matrix insert the filters currently specified filter parameter as a row into the matrix and run matrix factorization to predict the unobserved ratings in the filters for recommendation to the user. In some embodiments, such historically based filter parameter suggestions are computed offline and updated periodically.

In some embodiments, in order to generate recommendations in real-time, filter recommendation mechanism 140 utilizes the currently specified set of one or more filter parameters to query rows in the filter matrix that have a significant overlap (for example, at least 30% of the filters are in common). Then, given a sub-matrix with only rows that satisfy the overlapping requirement, the filter recommendation mechanism 140 performs a matrix column sum and recommends the top K filters (i.e., columns) that have the highest sum (i.e., popularity among the rows of historical jobs). This latter approach is extremely efficient since the matrix operations in the above two steps are compatible with parallel matrix multiplications, such as those supported by Numpy library.

Figure 8:
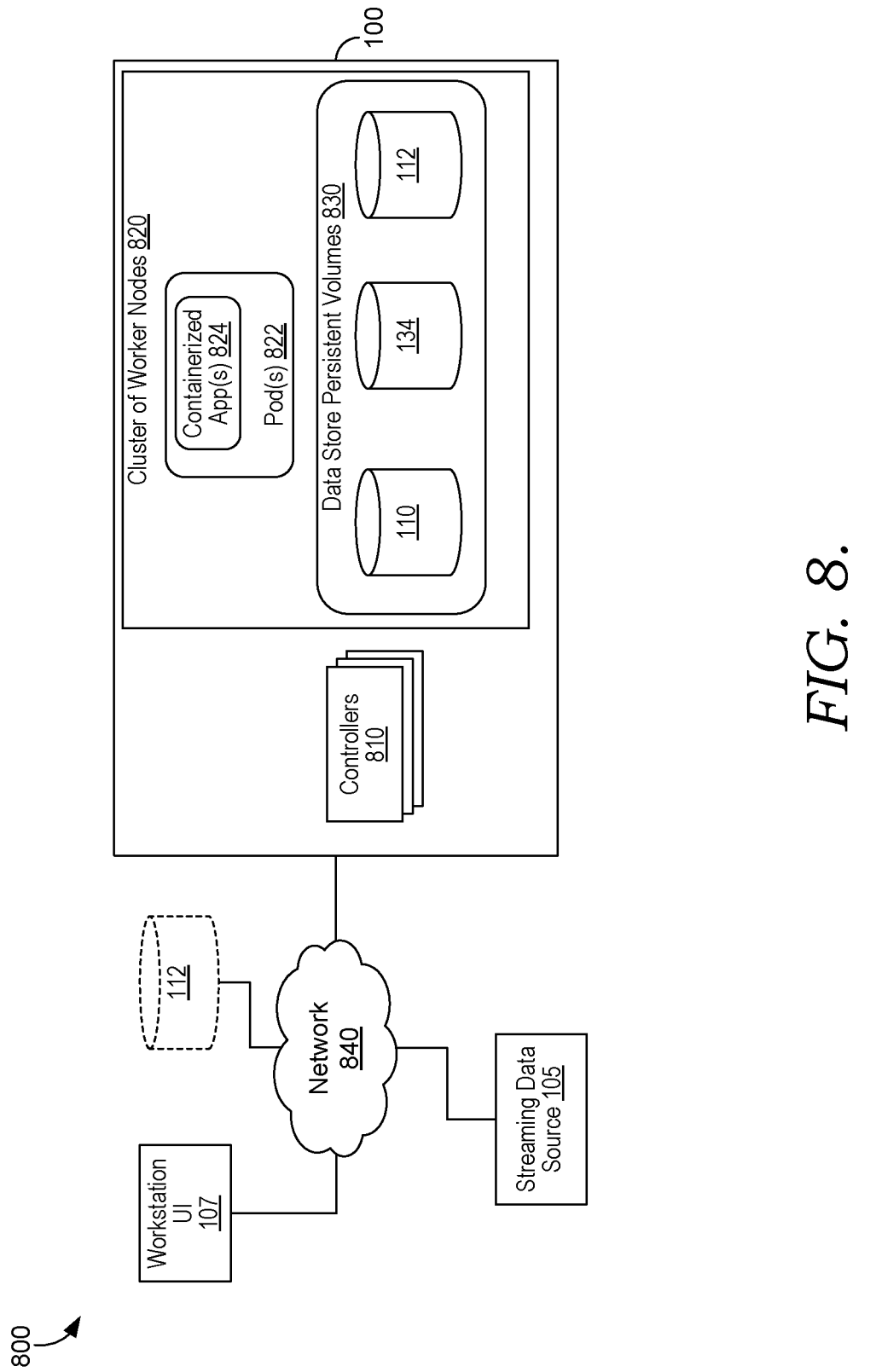
FIG. 8 is a block diagram illustrating an example system for implementing a data stream processing environment, in accordance with embodiments of the present invention.

FIG. 8 is a diagram illustrating a system 800 for implementing one or more aspects of the data stream processing environment 100 discussed with respect to any of the embodiments discussed herein. System 800 comprises one or more controllers 810 that each comprises one or more processors and memory, each programmed to execute code to implement the data stream processing environment 100. In one embodiment, the one or more controllers 810 comprise server components of a data center. The controllers 810 are configured to establish a cloud base computing platform (for example, a cloud agnostic computing solution) executing one or more virtualized micro services for the data stream processing environment 100. For example, in one embodiment one or more of the data filter 114, data stream sampling mechanism 131, bootstrap data set sampling mechanism 132, sample update mechanism 133, client filter service portal 135, filter recommendation mechanism 140, or other components of the streaming data filter configuration tool 130 are virtualized network service running on a cluster of worker nodes 820 established on the controllers 810. For example, the cluster of worker nodes 820 may include one or more of Kubernetes (K8s) pods 822 orchestrated onto the worker nodes 820 to realize one or more containerized applications 824 for the data stream processing environment 100. Similarly, in one embodiment, one or more of the data lake data store 110, representative sample data store 134, and profile data store 112, are implemented as data store persistent volumes 830 and/or No-SQL non-relational databases. In this example, the workstation user interface 107 and streaming data source 105 are coupled to the controllers 810 establishing the data stream processing environment 100 by a network 840 (for example, a public network such as the Internet, a proprietary network, or a combination thereof). As mentioned above, in some embodiments the profile data store 112 can be implemented outside of the data stream processing environment 100. In that case the profile data store 112 may also communicate to the data stream processing environment 100.

In various alternative embodiments, system and/or device elements, method steps, or example implementations described throughout this disclosure (such as the data filter, data stream processing environment, data stream sampling mechanism, bootstrap data set sampling mechanism, sample update mechanism, client filter service portal, filter recommendation mechanism, or other components of the data filter configuration tool, data lake data store, representative sample data store, and profile data store, workstation user interface, worker nodes, or any of the sub-parts of any thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the terms "computer readable media" and "computer storage media" refer to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as data filter, data stream processing environment, data stream sampling mechanism, bootstrap data set sampling mechanism, sample update mechanism, client filter service portal, filter recommendation mechanism, or other components of the data filter configuration tool, data lake data store, representative sample data store, and profile data store, workstation user interface, worker nodes, controllers, streaming data source, and other terms derived from these words refer to the names of elements that would be understood by one skilled in the art of big data, data stream analysis, and related industries, and are not used herein as nonce words or nonce terms for the purpose of invoking 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for data stream processing, the method comprising:
   receiving, at a data stream processing environment, a data stream from a streaming data source;
   generating a representative sample of the data stream, the representative sample including:
      a first set of sample elements comprising real-time sample elements directly sampled from the data stream by a data stream sampling mechanism executed by the data stream processing environment; and
      a second set of sample elements comprising previously stored sample elements of the data stream, sampled from a data lake data store by a bootstrap data set sampling mechanism executed by the data stream processing environment;
   receiving a selection of one or more filter parameters for a data filter that receives the data stream;
   computing one or more filter statistics estimates that represent applying the one or more filter parameters to the data stream, based on applying the one or more filter parameters to the representative sample;
   outputting to a workstation user interface the one or more filter statistics estimates; and
   in response to an instruction from the workstation indicating an approval of the one or more filter estimates, filtering the data stream using the data filter by configuring the data filter to apply the one or more filter parameters to produce a filtered data stream output.

2. The method of claim 1, further comprising:
   maintaining a freshness of the representative sample by applying a time-weighted algorithm to determine which sample elements are maintained in the representative sample.

3. The method of claim 2, further comprising:
   applying a timestamp to each of the sample elements of the representative sample indicating when each respective sample element was sampled;
   maintaining sample elements of the representative sample having the timestamp after a threshold time are maintained in the representative sample; and
   removing sample elements of the representative sample having the timestamp prior to the threshold time based on either a probability parameter or a proportion parameter.

4. The method of claim 1, further comprising:
   generating an initial representative sample of the data stream by systematically sampling the data stream, and by systematically sampling records of the data stream retrieved from the data lake data store; and
   storing the initial representative sample of the data stream to a representative sample data store.

5. The method of claim 1, wherein the one or more filter parameters are configured based on inputs received from the workstation user interface, the method further comprising:
   outputting one or more filter parameter suggestions to the workstation user interface, wherein the one or more filter parameter suggestions are generated based on the one or more filter parameters.

6. The method of claim 5, further comprising:
   generating the one or more filter parameter suggestions based on identifying values in the representative sample that are semantically similar to the one or more filter parameters.

7. The method of claim 5, further comprising:
   generating the one or more filter parameter suggestions based on correlating the one or more filter parameters to a log of historical filter sets.

8. A data stream processing environment, the data stream processing environment comprising:
   a data lake data store storing records of a data stream;
   a data filter configured to receive the data stream, and filter the data stream to produce a filtered output;
   a streaming data filter configuration tool coupled to the data lake data store and to the data filter, wherein the streaming data filter configuration tool is configured to:
      generate a representative sample of the data stream, the representative sample including:
         a first set of sample elements comprising real-time sample elements directly sampled from the data stream; and
         a second set of sample elements comprising previously stored sample elements of the data stream, sampled from the data lake data store;
      input one or more filter parameters for the data filter from a workstation user interface;
      compute one or more filter statistics estimates that represent applying the one or more filter parameters to the data stream, based on applying the one or more filter parameters to the representative sample;
      output to the workstation user interface the one or more filter statistics estimates for the one or more filter parameters; and
      configure the data filter to apply the one or more filter parameters to the data stream in response to an instruction from the workstation user interface.

9. The data stream processing environment of claim 8, further comprising:
   one or more controllers programmed to execute code to implement at least one of the streaming data filter configuration tool, the data filter, and the data lake data store.

10. The data stream processing environment of claim 8, further comprising:
    a sample update mechanism configured to maintaining a freshness of the representative sample, wherein the sample update mechanism applies a time-weighted algorithm to determine which sample elements are maintained in the representative sample.

11. The data stream processing environment of claim 10, wherein the sample update mechanism is configured to:
    apply a timestamp to each of the sample elements of the representative sample indicating when each respective sample element was sampled;
    wherein sample elements of the representative sample, having the timestamp after a threshold time, are maintained in the representative sample; and
    wherein sample elements of the representative sample, having the timestamp prior to the threshold time, are removed from the representative sample based on either a probability parameter or a proportion parameter.

12. The data stream processing environment of claim 10, wherein the sample update mechanism is configured to:
    generate an initial representative sample of the data stream by systematically sampling the data stream, and by systematically sampling records of the data stream retrieved from the data lake data store; and store the initial representative sample of the data stream to a representative sample data store.

13. The data stream processing environment of claim 8, further comprising a filter recommendation mechanism configured to generate one or more filter parameter suggestions based on the one or more filter parameters;

wherein the one or more filter parameters are configured based on inputs received from the workstation user interface; and wherein the one or more filter parameter suggestions are output to the workstation user interface.

14. The data stream processing environment of claim 13, wherein the filter recommendation mechanism generates the one or more filter parameter suggestions based on identifying values in the representative sample that are semantically similar to the one or more filter parameters.

15. The data stream processing environment of claim 13, wherein the filter recommendation mechanism generates the one or more filter parameter suggestions based on a correlation of the one or more filter parameters to a log of historical filter sets.

16. The data stream processing environment of claim 8, wherein an output of the data filter is coupled to a profile data store.

17. The data stream processing environment of claim 8, wherein the one or more filter statistics estimates include at least one of a proportion of filtered records and a filtered field frequency distribution.

18. One or more non-transient computer storage media storing instructions that, when used by one or more processors, cause the one or more processors to perform operations, the operations comprising:

receiving a data stream from a streaming data source;

generating a representative sample of the data stream, the representative sample including:

a first set of sample elements comprising real-time sample elements directly sampled from the data stream by a data stream sampling mechanism executed by the data stream processing environment; and a second set of sample elements comprising previously stored sample elements of the data stream, sampled from a data lake data store by a bootstrap data set sampling mechanism executed by the data stream processing environment;

receiving one or more filter parameters for a data filter;

computing one or more filter statistics estimates that represent applying the one or more filter parameters to the data stream, based on applying the one or more filter parameters to the representative sample;

maintaining a freshness of the representative sample by real-time sampling of the data stream;

providing, via a user interface, the one or more filter statistics estimates; and configuring the data filter to apply the one or more filter parameters to filter the incoming data elements of the data stream.

19. The one or more computer storage media of claim 18, the operations further comprising:

maintaining a freshness of the representative sample by applying a time-weighted algorithm to determine which sample elements are maintained in the representative sample.

20. The one or more computer storage media of claim 18, the operations further comprising:

outputting one or more filter parameter suggestions to the user interface, wherein the one or more filter parameter suggestions are generated based on the one or more filter parameters.

* * * * *